US009753508B2

United States Patent
Atkinson et al.

(10) Patent No.: US 9,753,508 B2
(45) Date of Patent: Sep. 5, 2017

(54) TEMPERATURE THRESHOLD ADJUSTMENT BASED ON HUMAN DETECTION

(75) Inventors: Lee W. Atkinson, Taipei (TW); Luca DiFiore, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 13/139,675

(22) PCT Filed: Dec. 15, 2008

(86) PCT No.: PCT/US2008/086888
§ 371 (c)(1),
(2), (4) Date: Jun. 14, 2011

(87) PCT Pub. No.: WO2010/071631
PCT Pub. Date: Jun. 24, 2010

(65) Prior Publication Data
US 2011/0251733 A1    Oct. 13, 2011

(51) Int. Cl.
*G05D 23/19* (2006.01)
*G06F 1/20* (2006.01)
*G06F 1/32* (2006.01)

(52) U.S. Cl.
CPC ............ *G06F 1/206* (2013.01); *G06F 1/3203* (2013.01); *G06F 1/3231* (2013.01); *Y02B 60/1289* (2013.01)

(58) Field of Classification Search
CPC .................................................. G06F 1/3231
USPC ....................................................... 700/300
See application file for complete search history.

(56) References Cited

U.S. PATENT DOCUMENTS

| 6,029,119 | A | 2/2000 | Atkinson | |
|---|---|---|---|---|
| 6,442,013 | B1 * | 8/2002 | Lindgren et al. | 361/280 |
| 6,470,289 | B1 | 10/2002 | Peters et al. | |
| 6,536,675 | B1 * | 3/2003 | Pesko et al. | 236/47 |
| 6,760,649 | B2 | 7/2004 | Cohen | |
| 2002/0080132 | A1 | 6/2002 | Dai et al. | |
| 2002/0152406 | A1 * | 10/2002 | Watts et al. | 713/300 |
| 2005/0046991 | A1 * | 3/2005 | Nakazato | 360/69 |
| 2006/0155424 | A1 | 7/2006 | Katoh et al. | |
| 2006/0192775 | A1 * | 8/2006 | Nicholson et al. | 345/211 |
| 2006/0193113 | A1 * | 8/2006 | Cohen et al. | 361/687 |
| 2006/0196953 | A1 * | 9/2006 | Simon et al. | 236/46 R |

(Continued)

FOREIGN PATENT DOCUMENTS

JP   2007-220003 A1   8/2007
KR   102006005513     5/2006

(Continued)

OTHER PUBLICATIONS

JP-2007-220003A to Fujiwara, Nobutoa. Japan Aug. 2007 (English translation appended to the end of Japanese Application Publication Document JP 2007-220003).*

(Continued)

*Primary Examiner* — Mohammad Ali
*Assistant Examiner* — Emilio J Saavedra
(74) *Attorney, Agent, or Firm* — Conley Rose, P.C.

(57) ABSTRACT

A system comprises a first proximity sensor adapted to detect a human. The system further comprises logic coupled to the first proximity sensor. The logic adjusts a temperature threshold based on whether a human has been detected.

7 Claims, 4 Drawing Sheets

(56) References Cited

U.S. PATENT DOCUMENTS

2007/0027580 A1* 2/2007 Ligtenberg et al. .......... 700/300
2007/0142976 A1   6/2007 Tezuka
2008/0021749 A1* 1/2008 Hope .............................. 705/7

FOREIGN PATENT DOCUMENTS

TW          317621       10/1997
TW      200825685 A      6/2008

OTHER PUBLICATIONS

Examination Report Under Section 18(3) received in related GB Application No. 1109197.2, mailed Jun. 13, 2013, 3 pgs.
International Searching Authority, International Search Report and Written Opinion, Appln No. PCT/US2008/086888, date of mailing Aug. 24, 2009, pp. 11.
Quantum Research Group, "QT108 8-Key QTouch Sensor IC," Copyright 2006-2007 QRG Ltd., 20 pp.
Examination Report Under Section 18(3), received in GB Applicaiton No. 1109197.2, mailed on Aug. 28, 2013, 2 pgs.
Examination Report Under Section 18(3) received in GB Application No. 1109197.2, mailed on Jan. 29, 2014, 3 pgs.
Taiwan Office Action issued in Appl. No. 98138972; dated Jun. 3, 2014; 7 pages.

* cited by examiner

TEMPERATURE THRESHOLD ADJUSTMENT BASED ON HUMAN DETECTION

BACKGROUND

Electronic systems such as computers typically employ a mechanism to maintain the system sufficiently cool. A system that becomes too hot may malfunction. For example, a fan may be used to blow air over the system's electronics. Alternatively, or additionally, logic may "throttle" the system's processor. Throttling a processor causes the processor to operate at a slower speed which results in the processor producing less heat.

Turning on a fan helps cool the system, but produces acoustic noise that a user may find annoying. Throttling a processor also helps cool the system, but results in degraded performance which users typically do not prefer. Thus, a tradeoff is made between, on one hand, achieving the highest performance possible with the least amount of acoustic noise and, on the other hand, preventing the system from becoming so hot that the system no longer works properly.

Some portable systems, such as laptop computers, are used in contact with the user. For example, as the name indicates, a laptop computer may rest on a person's lap. Further, the user's hands may rest on a handrest near a touchpad while using the laptop computer's keyboard. It is possible that, while the cooling mechanism maintains the laptop computer sufficiently cool to avoid a malfunction, a human user, nevertheless, may find the laptop uncomfortable to the touch.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
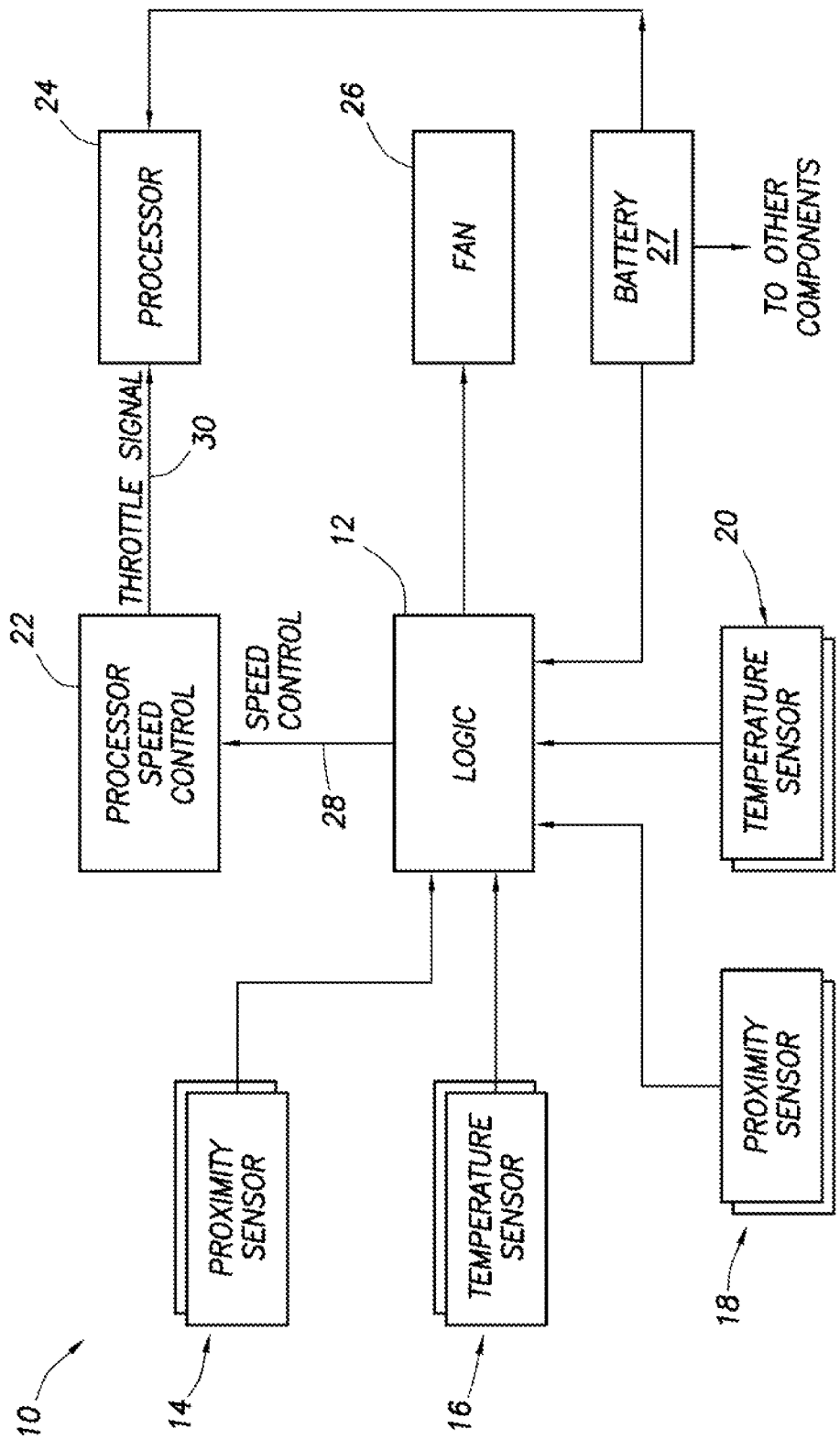
FIG. 1 shows a system employing proximity sensors in accordance with various embodiments.

Referring now to FIG. 1, a system 10 is shown in accordance with various embodiments. As shown in the illustrative embodiment, the system 10 comprises logic 12 coupled to proximity sensors 14 and 18, temperature sensors 16 and 20, a processor speed control unit 22, a processor 24, a fan 26, and a battery 27.

In Various embodiments, the logic 12 comprises an embedded controller and, in some particular embodiments, comprises the system's south bridge device or keyboard controller.

Each of the proximity sensors 14 and 18 comprise a sensor that is responsive to the presence of a human. Thus, the proximity sensors 14, 18 can differentiate between the system 10 resting on a work surface such as a desk from resting on a human lap. In some embodiments, the proximity sensors 14, 18 are capacitive devices such as the QT1081 Sensor IC provided by Quantum Research Group. The proximity sensors may comprise optical sensors as well. The presence of a human near one of the proximity sensors causes that sensor to assert a signal to the controller 12 to enable the controller 12 to detect that a human is near the sensor. Two proximity sensors 14 and two proximity sensors 18 are shown in the embodiment of FIG. 1, but any number (one or more) of proximity sensors can be used.

The temperature sensors 16 and 20 comprise any suitable type of temperature sensor such as thermocouples. In accordance with various embodiments, one temperature sensor 16, 20 is provided on or near each of the proximity sensors 14, 18. A pair of temperature sensors 16 and another pair of temperature sensors 20 are shown in the embodiment of FIG. 1, but any number (one or more) of temperature sensors can be used.

The system 10 also comprises at least two cooling mechanisms that are activated by the logic 12. In other embodiments, only a single cooling mechanism is provided while in other embodiments, more than two cooling mechanisms are provided. In the embodiment shown in FIG. 1, the fan 26 is one cooling mechanism. The fan 26 can be turned on and off by the logic 12 and the logic 12 can also control the fan's speed. The fan 26 may blow cool air over the system's electronics or cause warm air to be exhausted from the system.

Another cooling mechanism depicted in the illustrative embodiment of FIG. 1 comprises the ability of the processor 24 to be throttled. The processor 24 comprises the system's main processor (i.e., the processor that executes an operating system and applications). In some embodiments, more than one processor 24 may be provided and one or more of such multiple processors may be throttled as described herein. Processor speed control unit 22 receives a speed control signal 28 from logic 12 and asserts a throttle signal 30 to the processor 24. The throttle signal 30, in some embodiments, may permit the processor 24 to operate at full speed or, to reduce the temperature of the system, to operate at a lower speed. In some embodiments, the processor speed control unit 22 comprises an ACPI (Advanced Configuration and Power Interface) operating system. Implemented as the ACPI operating system, the processor speed control unit 22 comprises executable code that implements the ACPI specification.

The logic 12 receives temperature information from the various temperature sensors 16, 20 and compares the sensed temperature to a threshold. If the temperature is below the threshold, in some embodiments the logic 12 does not activate the system's cooling mechanism, or causes the cooling mechanism to operate at a reduced state (e.g., minimal cooling capability). If, however, the temperature exceeds the threshold, the logic 12 activates one or both of the cooling mechanisms (fan, processor throttling) to try to reduce the temperature of the system. The system 10 is programmable as to which cooling mechanism is to be activated or the order of which the cooling mechanisms are activated. For example, a user may configure the system (via, for example, ACPI) to have the fan turned on first to try to bring down the system temperature and, if that does not work to reduce the temperature below the threshold, then to also throttle the processor 24, or vice versa.

The proximity sensors 14, 18 provide a way for the logic 12 to determine or detect whether a human is in contact with the system 10. If a human is in contact with the system, the human may find the system to be uncomfortably warm to the touch. The system automatically adjusts the operation of the cooling mechanism based on whether or not a human is contact with the system. If a human presence is detected, then priority is placed on cooling the system sufficient for a human in contact with the system to be comfortable. If no human presence is detected, then priority is placed on cooling the system to prevent malfunctions.

In some embodiments, the logic 12 adjusts the temperature threshold associated with the activation of the cooling mechanism. If a human presence is detected, the logic 12 causes the temperature threshold to be lowered, or maintained at an already reduced level, to thereby cause the cooling mechanism to be activated at a lower temperature to reduce the likelihood that the human will find the system uncomfortable to the touch.

If a human presence is not detected, then logic 12 increases the temperature threshold, or maintains the threshold at an existing higher level. At such a higher level, the system 10 will be kept sufficiently cool to avoid a malfunction, but a human might find the system to be uncomfortable to the touch (but human comfort is not an issue in this case as the system is not in contact with a human).

Figure 2:
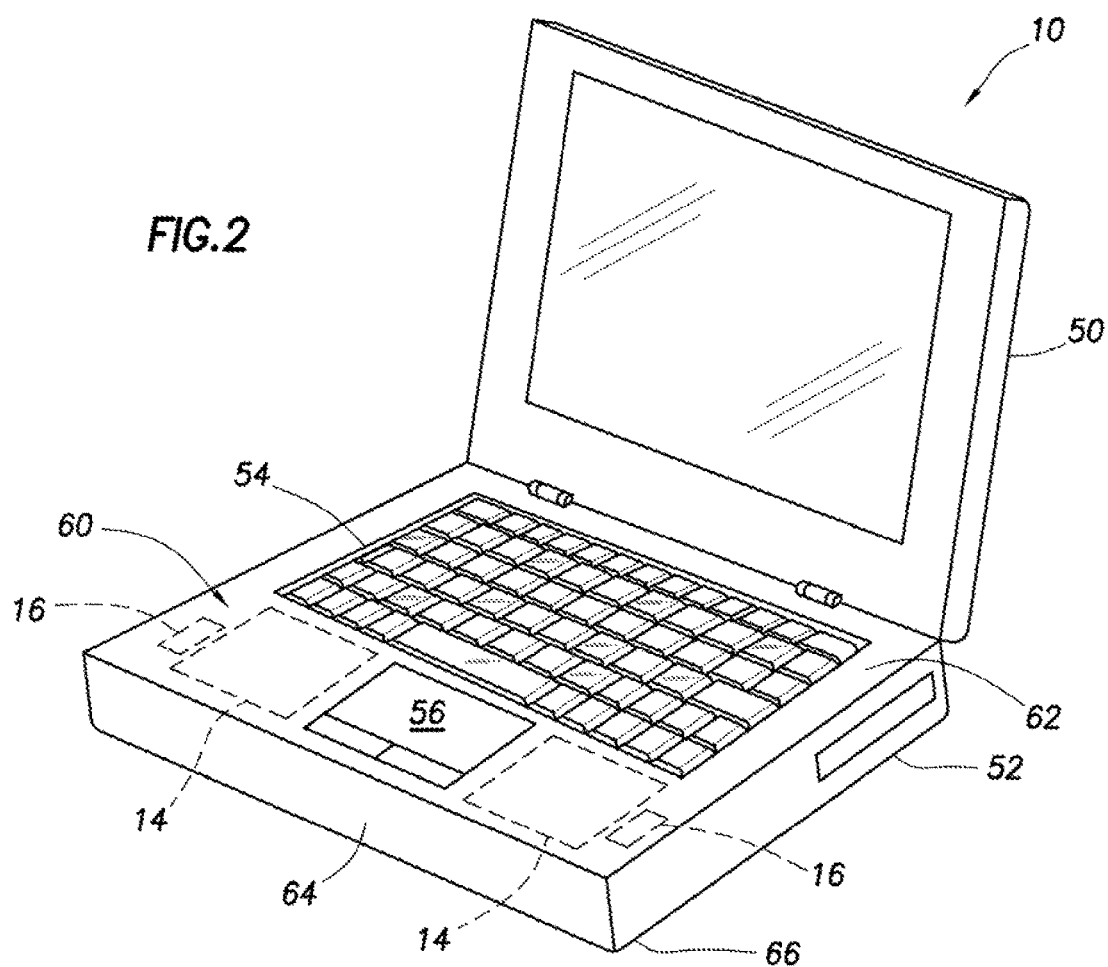
FIG. 2 shows a perspective view of the system in accordance with various embodiments.

FIG. 2 illustrates a view of system 10 in the form of a laptop computer. As shown, the system 10 comprises a display 50 hingeably coupled to a base 52. The base 52 comprises a top surface 62 in which a keyboard 54 and touchpad 56 are provided. A handrest area 60 comprises the area of the top surface 62 below the keyboard (i.e., the area between the keyboard and the front surface 64 of the base 52). The touchpad 56 is provided in the handrest area 60. The base 52 also comprises a bottom surface 66.

When the user places his or her hands in position to use the keyboard 54, the user's hands (e.g., the palms or heals of the hands) will be in contact with at least some of the handrest area 60. At least one proximity sensor 14 is mated to the underside of the top surface 62 in the handrest area 60 on either side of the touchpad 56. The proximity sensors 14 are thus internal to the system's base 52 and hidden from view as indicated by the dashed line rendering of the proximity sensors 14. A temperature sensor 16 is also provided near each proximity sensor and thus is also hidden from view. The proximity sensors 16 can detect the presence of a human (e.g., human hands) placed on or near top surface 62 in the handrest area 60.

Figure 3:
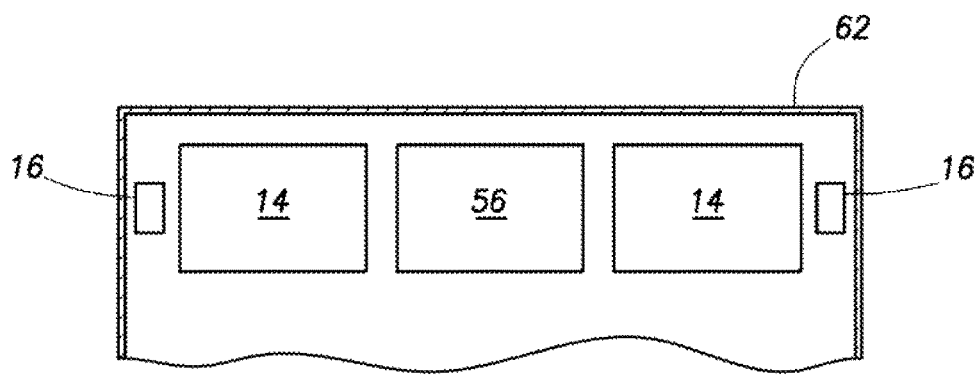
FIGS. 3-5 show additional views of portions of the system depicting possible locations for the proximity sensors in accordance with various embodiments.

FIG. 3 illustrates the underneath side of top surface 62 illustrating one possible location of the proximity sensors 14 on either side of the touchpad 56. A temperature sensor is shown adjacent each proximity sensor.

Figure 4:
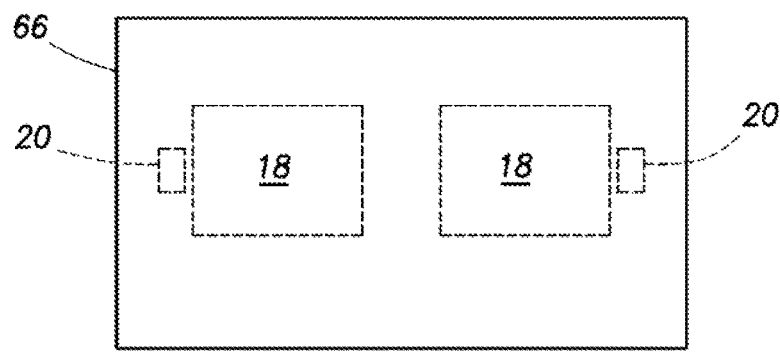
Figure 5:
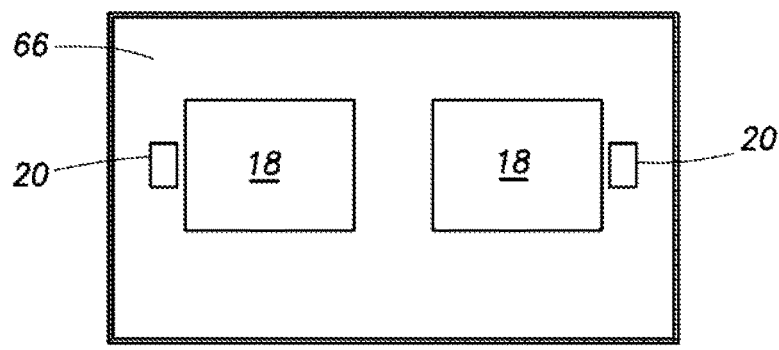

FIGS. 4 and 5 show opposite views of the bottom surface 66 of the base 52. As shown, a pair of proximity sensors 18 is mated to the bottom surface 66 and a temperature sensor 20 is mated to the bottom surface near each proximity sensor. FIG. 4 shows the bottom surface 66 as seen by the user if the user were to flip the system 10 over. The proximity sensors 18 and temperature sensors 20 are mated to the bottom surface 66 but internal to the system and thus are shown in dashed line. FIG. 5 shows a view of the bottom surface 66 as seen from inside the system 10.

Figure 6:
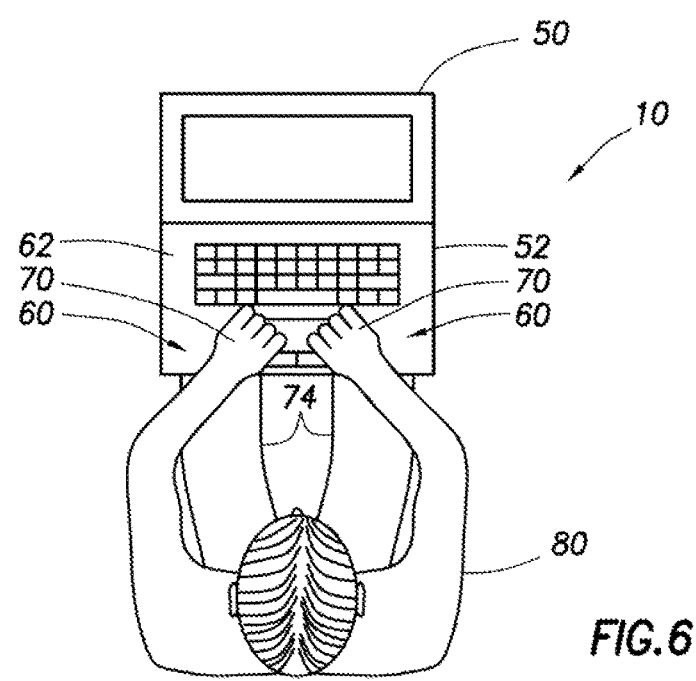
FIG. 6 illustrates the use of the system by a human in accordance with various embodiments.

FIG. 6 illustrates a human 80 using system 10 with the system placed on the user's lap and the user's hands 70 placed on the handrest area 60. As can be seen, the base 52 is placed across the legs 74 of the human 80 and thus the proximity sensors 18 mounted in the bottom of the base can detect the presence of the human's legs, and thus the human him or herself. The proximity sensors 14 provided in the handrest area 60 of the top surface 62 detect the presence of the human's hands 70.

Figure 7:
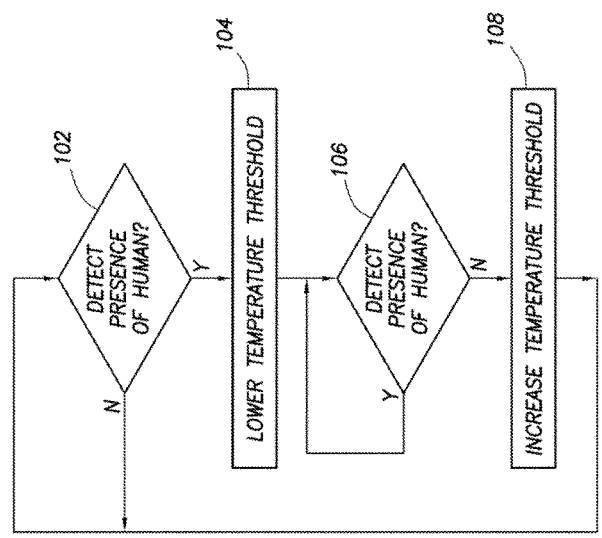
FIG. 7 illustrates a method in accordance with various embodiments.

FIG. 7 illustrates one suitable method in accordance with various embodiments for adjusting the operation of the cooling mechanism, and specifically the temperature threshold discussed above. The method depicted in FIG. 7 assumes that the system 10 defaults to the higher temperature threshold level upon system initialization. The temperature threshold is lowered once a human's presence has been detected. In other embodiments, the system defaults to the lower temperature threshold and is raised if no human contact is detected. The various actions shown in FIG. 7 may be performed by logic 12 acting in concert with the proximity sensors 14, 18.

At 102, the method comprises detecting whether a human is in proximity to at least one of the proximity sensors 14, 18. If no human presence is detected, then control loops back and the human presence detection step of 102 is repeated until a human presence is detected. In accordance with various embodiments, a human is considered to be detected if one of the proximity sensors 14, 18 indicates a human presence for more than a predetermined amount of time, such as five seconds, to prevent changes to the temperature threshold based only on fleeting human contact.

Once human presence is detected at 102, control then passes to 104 in which the logic 12 lowers the temperature threshold. At 106, the logic 12 again detects whether a human is in proximity to at least one of the proximity sensors. As long as the logic 12 continues to detect the presence of a human, control loops back on decision step 106. Once a human is no longer detected (e.g., the user has moved the system from his lap to a table top and is no longer touching the handrest area 60), then at 108, the logic 12 increases the temperature threshold and control loops back to decision step 102. In accordance with various embodiments, a human considered not to be detected if all of the proximity sensors 14, 18 indicate the absence of a human presence for more than a predetermined amount of time, such as five seconds, to prevent changes to the temperature threshold based only on a fleeting cessation of human contact with the system. Moreover, the temperature threshold is forced to a lower level if a human is determined to be in contact with the system and raised to a higher level if no human contact is detected.

Figure 8:
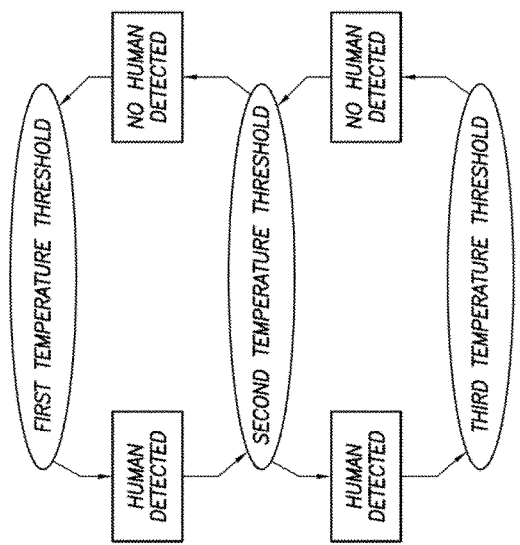
FIG. 8 illustrates the transition between three temperature thresholds based on whether a human is detected in accordance with various embodiments.

In other embodiments, more than one temperature threshold is implemented. For example, first, second, and third temperature thresholds may be used. FIG. 8, for example, illustrates three such temperature thresholds and what triggers the transition from one threshold to another. Looking at the top of the figure at the first temperature threshold and following the figure down the left-hand side, if a human presence is detected, the logic 12 lowers the temperature threshold from the first temperature threshold to the second temperature threshold, which is lower than the first temperature threshold. If a human presence is still detected after a predetermined period of time, the logic 12 lowers the temperature threshold even more to from the second temperature threshold to the third temperature threshold, which is lower than the second temperature threshold. While the threshold is set at the intermediate second temperature threshold, if the human presence is no longer detected, then the logic 12 increases the threshold back to the higher first temperature threshold.

Starting at the bottom of FIG. 8 (third temperature threshold) and following the figure up the right-hand side, if human contact is no longer detected, then the logic 12 increases the temperature threshold from the third temperature threshold to the second temperature threshold, and if human contact continues not to be detected, then increases the second temperature threshold up to the first temperature threshold. While the threshold is set at the intermediate second temperature threshold, if the human presence is again detected, then the logic 12 decreases the threshold back down to the lower third temperature threshold.

At whatever temperature threshold the logic 12 sets based on signals from the proximity sensors 14, 18, the logic activates the system's cooling mechanism based on a comparison of the temperature reading from one or more of the temperature sensors 16, 20 to the programmed threshold. The temperature sensor 16, 20 used in this comparison may be the temperature sensor adjacent the proximity sensor 14, 18 that caused the change in the temperature threshold. For example, if the logic 12 detects that the system 10 is sitting on a person's lap, as determined based on signals from proximity sensors 18 in the bottom of the base 52), then the logic 12 may monitor the temperature readings from the temperature sensors 20 adjacent those particular proximity sensors. If the logic 12 detects that a human is present based on input from more than one proximity sensor 14, 18, then the logic 12 selects only one temperature sensor associated with such proximity sensors to monitor. Alternatively, the logic 12 may average together the temperature readings from such temperature sensors and compare the average temperature value to the programmed threshold.

In other embodiments, the system 10 comprises only a single temperature sensor that is not necessarily near or adjacent any particular proximity sensor. In still other embodiments, more than temperature sensor may be used in system 10, but none of such temperature sensors may be adjacent any of the proximity sensors.

In other embodiments, temperature sensors are not used to trigger the system's cooling mechanism. Instead, the power consumption of the system can be measured or determined. Power consumption can be determined by the processor as current from battery 27 multiplied by its voltage output. An increase in power consumption in excess of a threshold (which is adjustable as explained above based on signals from the proximity sensor(s)) may activate the system's cooling mechanism. In another alternative to temperature sensors, activity of one or more system components can be used to control the system's cooling mechanism. For example, the speed of the processor 24 can be used to control the fan 26. An adjustable threshold, per the proximity sensors 14, 18, is associated with processor speed. Processor speed in excess of the threshold causes an increase in fan speed.

In yet other embodiments, proximity of human hands on the handrest area 60 can be inferred from keyboard activity. That is, if the logic 12 detects keys on the keyboard 54 being pressed, then the logic can infer that human hands are near or in contact with the handrest area 60. In essence, the keyboard 54 itself becomes, in part, a proximity sensor.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   determining whether a human is in contact with a computer based on a signal from a proximity sensor in the computer; and
   in response to determining the human in contact with the computer:
   decreasing a temperature threshold for the computer from a first temperature threshold to a second temperature threshold;
   based on a signal from the proximity sensor indicating continued contact of the computer by the human for more than a predetermined period of time, further decreasing the temperature threshold from the second temperature threshold to a third temperature threshold; and
   detecting whether the temperature threshold has been exceeded and, in response to detecting that the temperature threshold has been exceeded, throttling a processor.

2. The method of claim 1 further comprising in response to determining that the human is not in contact with the computer, increasing the temperature threshold.

3. The method of claim 1 further comprising in response to detecting that the temperature threshold has been exceeded, causing at least one of turning on a fan, and increasing fan speed.

4. A computer, comprising:
   a fan;
   a processor;
   a proximity sensor to detect when a human is in contact with the computer; and
   logic coupled to said proximity sensor, said fan, and said processor, said logic to adjust a temperature threshold based on whether a human has been detected, and said logic to control the fan and to throttle the processor;
   wherein, based on a signal from the proximity sensor indicating presence of a human, the logic is to decrease the temperature threshold from a first temperature threshold to a second temperature threshold, and based on a signal from the proximity sensor indicating continued presence of the human for more than a predetermined period of time, the logic is to further decrease the temperature threshold from the second temperature threshold to a third temperature threshold.

5. The system of claim 4 wherein, based on a signal from the proximity sensor indicating that the human is not in contact with the computer, the logic is to increase the temperature threshold from the third temperature threshold to the second temperature threshold, and based on a signal from the proximity sensor indicating that the human still is not in contact with the computer, the logic is to further increase the temperature threshold from the second temperature threshold to the first temperature threshold.

6. The system of claim 4 wherein the proximity sensor comprises at least one of a capacitive sensor and an optical sensor.

7. The computer of claim 4 wherein the computer is a laptop computer.

* * * * *